June 14, 1966 V. STARK 3,256,440

DEVICES FOR PROTECTION AGAINST RADIOACTIVE FALLOUT

Filed Dec. 20, 1961 7 Sheets-Sheet 1

INVENTOR.
VIRGIL STARK
BY Eyre, Mann & Lucas
ATTORNEYS

INVENTOR
VIRGIL STARK
BY
Eyre, Mann & Lucas
ATTORNEYS

June 14, 1966 V. STARK 3,256,440

DEVICES FOR PROTECTION AGAINST RADIOACTIVE FALLOUT

Filed Dec. 20, 1961

7 Sheets-Sheet 3

INVENTOR.
VIRGIL STARK

BY

Eyre, Mann + Lucas

ATTORNEYS

DEVICES FOR PROTECTION AGAINST RADIOACTIVE FALLOUT

Filed Dec. 20, 1961 7 Sheets-Sheet 4

INVENTOR.
VIRGIL STARK

BY

Eyre, Mann + Lucas
ATTORNEYS

INVENTOR.
VIRGIL STARK
BY
Eyre, Mann & Lucas
ATTORNEYS

June 14, 1966 V. STARK 3,256,440

DEVICES FOR PROTECTION AGAINST RADIOACTIVE FALLOUT

Filed Dec. 20, 1961 7 Sheets-Sheet 6

INVENTOR.
VIRGIL STARK

BY

Eyre, Mann + Lucas
ATTORNEYS

DEVICES FOR PROTECTION AGAINST RADIOACTIVE FALLOUT

Filed Dec. 20, 1961 7 Sheets-Sheet 7

INVENTOR.
VIRGIL STARK
BY
Eyre, Mann & Lucas
ATTORNEYS

United States Patent Office 3,256,440

Patented June 14, 1966

3,256,440

DEVICES FOR PROTECTION AGAINST RADIOACTIVE FALLOUT

Virgil Stark, 936 5th Ave., New York, N.Y.

Filed Dec. 20, 1961, Ser. No. 160,731

12 Claims. (Cl. 250—108)

This invention relates to devices for protection against radioactive fallout. It is intended to furnish protection for persons when outside of fallout shelters, allowing them to leave and return to the shelter while being protected. The invention also permits an individual to leave a contaminated area to reach shelter, to inspect and police an area and take measures for decontamination, or a person in a shelter may leave to return home after other protective measures have been taken.

The invention provides certain forms of shielding units which may be collapsible containers or compartments or bags to be filled with liquid or powder and which can be used in combination with movable fallout protection devices or fixed fallout shelters in the field or in dwellings.

The Office of Civil and Defense Mobilization (OCDM) has published data on fallout in a series of National Plan Appendices on fallout.

The protection devices covered by this invention take into consideration such information to evaluate the abnormal conditions and respective protection from radioactive fallout. For a better understanding of the protection provided by this invention, the conditions and terminology used are first set forth hereinbelow.

This invention considers protection only from fallout radiation of certain intensity. The fallout may extend over an area of possibly 200 miles or more from the point of detonation, depending on the conditions. The protective devices described below are not intended for protection against the shock waves and thermal radiation produced in a nuclear explosion. The destruction caused by these forces may extend over a 10 miles radius from a 25 megaton surface blast. However, distant areas which are not at all destroyed may be affected by the radioactive fallout resulting in sickness or death for many persons.

The radioactive fallout originates from particles of matter, some as small as 50 to 500 microns in size, which act as sources of alpha, beta and gamma radiation. These particles are produced during the detonation of a nuclear weapon which forces large quantities of earth, water, debris, etc. into the fireball, producing radioactive isotopes of the elements, which then are carried into the mushroom cloud reaching high altitudes (such as 80,000 feet) and carried to great distances at this height away from the point of detonation. Thereafter, the particles settle back down to the ground over a period of time. Most of the particles fall back to the earth's surface within two days and are called "early fallout," which represents the most serious danger and against which protection is provided by the present invention. The "delayed fallout," which may persist for long periods and has a greatly decreased intensity, does not require any special protection.

Significant amounts of early fallout arrive outside the blast area only after one half hour following the explosion.

The fallout particles emit several types of radiation: alpha, beta and gamma rays and free neutrons. Alpha and beta particles have short ranges and can easily be stopped by heavy clothing or ⅛ inch thickness of metal, for instance.

The gamma rays, which are similar to X-rays, and the free neutrons both have great penetrating ability and can cause serious damage to living tissues and cells.

The neutron radiation is present only in initial radiation released from a nuclear weapon and is not present in so-called fallout.

The objective of the fallout shelter is to provide a shield against gamma radiation and the problems of any protection are therefore restricted to the gamma radiation.

The unit of measurement for the intensity of gamma radiation is the Roentgen (r.), which is equivalent to the release of approximately 87 ergs of energy per gram of air. The unit defining the absorbed dose of radiation is called "rad," and is equivalent to the absorption of 100 ergs of energy per gram of absorbing material. To assess the biological injury resulting from the absorption of radiation, a unit called REM has been established which is the RBE multiplied by the dose in rads. The RBE of a given radiation is defined as the ratio of absorbed dose of gamma radiation in rads to rads of the given radiation having the same biological effect. The RBE shows the degree of damage such as disabling sickness and death resulting from gamma radiation.

The exposure rate to gamma radiation is expressed in Roentgens per hour (r./h.). The length of exposure is very important as the radiation effects are cumulative. The human body has the ability to recuperate from exposure and repair some of the damage produced. Intermittent exposure over a long period of time may be less harmful than a continuous exposure received in a few hours. Means for protection against short term exposures of high intensity radiation which are more harmful are provided in this invention.

The effect of radiation depends on the "biological variability" of the individual, and on the percentage of the surface of the body exposed. It is more damaging to certain parts of the body such as thyroid glands, lungs, spine, heart, and reproductive organs than to others such as the arms, legs, etc. For reference in considering the biological effects of acute radiation dose over the whole body, a quantity called "medium lethal" dose is used. This is a dose which will cause the death within a month of 50% of the individuals exposed, the other 50% recovering after radiation sickness. Exposure to about a 450 Roentgen dose is considered a reasonable average for the "median lethal" dose.

The following tabulation is published by the OCDM for short term whole-body exposure in Roentgen per hour:

| R./h.: | |
|---|---|
| 0–100 | No obvious effects. |
| 100–200 | Minor incapacities. |
| 200–600 | Sickness and some death. |
| Over 600 | Few survivors. |

The objective of my invention is to reduce the radiation effects (RBE) in areas contaminated with high radiation.

The intensity of gamma radiation decreases rapidly in time, especially in the first hours and also during the first 24 hours after explosion. This process is known as "radioactive decay." The rate of radioactive decay is expressed in units of "Curie" which is the quantity of radioactive material undergoing $3.7 \times 10^{10}$ disintegration per second or the rate of disintegration of 1 gram of radium. One megacurie equals one million curies/sec.

The gamma radiation activity from a 1 megaton explosion decreases as follows:

| Time after explosions: | Activity (megacuries) |
|---|---|
| 1 hour | 300,000 |
| 1 day | 6,600 |
| 1 week | 640 |
| 1 month | 110 |
| 1 year | 5.5 |

As a general rule, for every sevenfold increase in time after the first hours following detonation, the dose rate decreases by a factor of ten. For example, if the radiation is 100 r./h. three hours after the explosion, after 21 hours (3×7) following the explosion (assuming no weathering effects), the radiation will be only 10 r./h. (1/10).

The publications of the OCDM indicate that the fallout following 12 hours after detonation varies, depending on the weather conditions in each area, and especially with regard to the direction and speed of the prevailing winds (particularly from 5000 to 80,000 feet layer of the atmosphere). A certain pattern of probable fallout area based on the U.S. Weather Bureau surveys over a five year period has been established. The pattern curves show that the probability and intensity in one particular place of fallout will depend not only on the distance from the center of the explosion, but also on wind direction. If the center of detonation is New York city, for instance, a location of approximately 100 miles in the northeast direction (New London, Connecticut area) will receive approximately 50% of the total fallout, whereas locations in the northwest or west direction (Morristown, New Jersey, for instance, a distance of only approximately 30 miles) will receive less than 30% fallout.

Shielding from fallout radiation is a combination of "barrier shielding" and "geometry shielding," the combined effects being called "protection factor."

The barrier shielding, which is the most important, is evaluated by the "mass thickness" and is expressed as the weight in pounds per square foot of the barrier. This protection depends on the shielding material or materials (its density lb./cf.) and their combined thickness.

The geometry shielding is determined by the extent of the fallout field effecting the individual and on the distance from it (including height or depth) and the geometrical form of the shield. Various factors are involved in the contribution to protection by geometry shielding such as ground, height, depth, form of shield, surroundings, etc.

The effectiveness of a given material in decreasing the radiation intensity is expressed in "half value layer thickness." This is the thickness of the specific material which absorbs half of the gamma radiation falling upon it. Thus, if a person is exposed to 300 Roentgen/hour with no shielding, the introduction of "half value layer thickness" of any material would decrease the dose to approximately 150 r./h. The addition of another layer "of half value thickness" will reduce the dose to 75 r./h. and so on.

The approximate "half value layer thickness" for gamma radiation emitted by fission products for a variety of materials are as follows:

| | Density (lb./cf.) | Half Value Layer Thickness in Inches |
|---|---|---|
| Lead | 710 | 0.45 |
| Steel | 490 | 0.7 |
| Concrete | 144 | 2.2 |
| Earth | 100 | 3.3 |
| Water | 62.4 | 4.8 |
| Wood | 34 | 8.8 |

The "attenuation factor" of a given shield is the ratio of the dose falling upon it and the dose behind the shield. The following tabulation gives an indication of the attenuation factor for several materials at different thicknesses.

| Attenuation Factor | 1.5 | 2 | 3 | 7 | 10 |
|---|---|---|---|---|---|
| Lead inches | 0.25 | 0.35 | 0.55 | 0.85 | 0.1 |
| Steel do | 0.7 | 1.2 | 1.5 | 2.4 | 2.8 |
| Concrete do | 3 | 4.4 | 6 | 8.5 | 10 |
| Water do | 7 | 9 | 13 | 17 | 20 |

If a very high radiation intensity prevails, for instance, 300 Roentgen/hour,which is estimated to be the radiation produced in a 20 megaton bomb at about 2.5 miles distance from the point of detonation, death or severe sickness may result on prolonged exposure. While 300 r./h. may result in death, if the radiation can be reduced to 100 r./h. by an attenuation factor of 3 or to 150 r./h. by an attenuation of 2, this lower radiation level will allow an individual to leave a shelter for a short time without danger of death or serious radiation sickness. If the 300 r./h. prevails three hours after detonation, for instance, after another hour the dose will be reduced through natural radiation decay to approximately 106 r./h. and an attenuation factor of two provided by a shield will further reduce the dosage to 53 r./h. which is without serious effect on the individual. If the shield is submerged under 20 inches of water, then the "attenuation factor" will be ten and radiation only 30 r./h., a sharp decrease from the original 300 r./h.

If the individual is lifted to a height of approximately 300 feet above the fallout region, an attenuation factor of approximately 5.5 is obtained; that is, the dose is reduced by "geometrical shielding" from 300 r./h. to 54 r./h. At a height of 800 feet an attenuation factor of 18 reduces the radiation to only 17 r./h.

The objective of this invention is to provide "barrier shielding" of dense material of appropriate thickness together with the "geometrical shielding" so as to obtain a sufficient "protection" and "attenuation factor," taking into account the time elements, the radioactive decay, the patterns of fallout distribution, distances and other factors to obtain movable portable protection against radioactive fallout and especially the gamma rays, thereby allowing the individual to move and also to obtain rapid protection in either fixed or movable enclosures.

The main difficulty in providing portable or movable efficient "barrier shielding" against gamma rays is the weight of the shielding required.

The area of surface of the human body averages on the order of 18 square feet and if all the surface of the body has to be protected by an attenuation factor of say approximately two, the weight required for barrier shielding will be on the order of 800 lbs. With increase of outside surface because of the surface of the shield, the weight may be on the order of 1000 lbs. Obviously, the human body can not carry such a weight. If a lesser degree of protection is considered for the less sensitive parts of the body (arms, legs, etc.), which represent approximately 40% of the total surface of the body, and using a lesser attenuation factor, the weight of the protective shielding may be reduced accordingly and possibly down to about 300 lbs. which is still a heavy weight.

More weight can be carried on the individual, if this weight is compensated by buoyant devices, such as one or more balloons properly supported and distributed and filled with light gas such as hydrogen, as will be shown hereinafter.

If, however, the "barrier shield" is combined with movable mechanical structures, a weight of well over 1000 lbs., can be supported without difficulty.

This invention covers several solutions, allowing protection against radioactive fallout, either for one person or several persons, and also allowing variation of "half value thickness" and the attenuation factor so as to reduce the radiation intensity inside the protective structure.

One of the basic principles of this invention is to provide, as a "variable mass thickness," one or more layers of flowable material between several walls or panels either fixed or movable or collapsible.

Such panels may be located parallel or at an angle such as 90° towards each other. Several such panels may constitute a container or a series of containers inside of each other forming separate compartments. Means are provided for filling the containers with a flowable material which by its density provides a mass barrier and shielding against radiation. Such flowable material may be solid particles such as sand, iron oxide, etc., or slurries of solid particles in liquid carriers, or liquids such as water, oil, mercury, etc. For simplicity of description, the above flowable materials are hereafter indicated by reference to water specifically, it being understood that any of the other flowable materials may be substituted. The filling can be done in series by interconnecting the different compartments.

The mass of water filled in the compartments of selected thickness will provide the barrier shield. The degree of fallout protection of such barrier can be varied in height or at the sides by having one or more adjacent compartments filled totally or partially with water, thus varying the thickness of the water barrier.

For a better understanding of further details of the invention, reference will be made to the accompanying drawings which illustrate specific embodiments thereof and of which:

Figure 1:
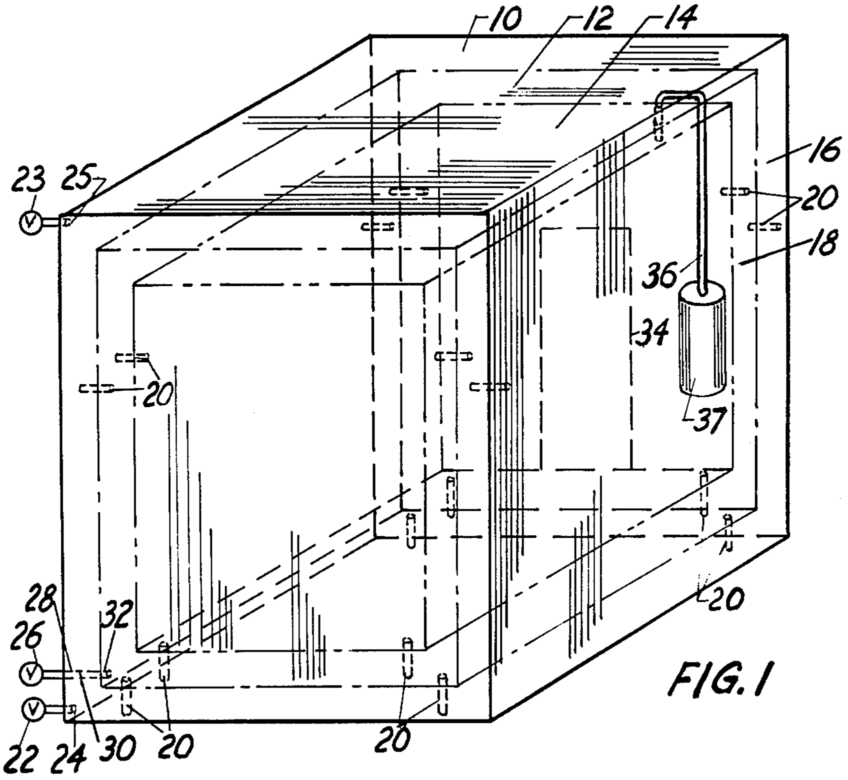
FIG. 1 is a perspective view of one form of variable barrier shielding with the interior thereof being shown in phantom.

As shown in FIG. 1, one form of fallout protection device which will provide variable barrier shielding in accordance with the invention consists of a plurality of box-like enclosures 10, 12 and 14 respectively, which are positioned successively one within the other in spaced relationship to form a plurality of individual compartments 16 and 18. The enclosures 10, 12 and 14 are maintained in spaced relationship by spacer rods 20 which are attached to the bottom and side walls of each enclosure as by welding or other suitable means. Positioned at the bottom and top of one side wall of the outermost enclosure 10 are valves 22 and 23 which control entry or exit of flowable materials through openings 24 and 25 in the side wall. Also positioned at the bottom of one side wall of enclosure 12 is a valve 26 which communicates with a pipe 28 passing through opening 30 in the side wall of enclosure 10 to the opening 32 in the side wall of enclosure 12. A bushing is secured around the pipe 28 at opening 30 in the side wall of enclosure 10 to provide a water tight seal. Valve 26 is so constructed that it will open or close the opening 32 when manipulated. Positioned in one side wall of all three enclosures 10, 12 and 14 is a door 34 which may be mounted by any conventional means such as hinges. Preferably this door is formed as a single hollow compartment to permit filling thereof with a flowable material. Extending through the top walls of enclosures 10, 12 and 14 is a vent 36 by which air can enter or leave the innermost enclosure 14. Vent 36 is equipped with a filter 37 at its open end for blocking entry of radioactive particles into the innermost enclosure 14. It is preferred that the length of vent 36 in its vertical position along the side wall of enclosure 10 be at least five feet as it has been found that winds can not blow finer radioactive particles which may pass through filter 37 up to this height.

In the event of the need for protection against nuclear fallout, the two individual compartments 16 and 18 between the enclosures 10, 12 and 14 may be rapidly filled with a flowable material to provide barrier shielding of varying effectiveness. For example, if maximum protection is desired, then valves 22 and 26 are opened and water is fed into enclosure 10 through the opening 24. Since the opening 32 is also open, the water will gradually fill both compartments 16 and 18 after which the water will overflow through valve 23 near the top wall of enclosure 10. Thereafter, all valves are closed and the double layer of water, held in the two compartments 16 and 18, completely surrounds the interior of the innermost enclosure 14. On the other hand, if it is desired to fill the innermost compartment 18 only partially, then valve 22 is turned to the full open position but valve 26 only to a partially open position. As water flows through both valves 22 and 26, the water level will rise more rapidly in compartment 16 than in compartment 18. By the time the water overflows through valve 22, compartment 18 will be only partially filled while compartment 16 will be completely filled. Thereafter, all valves are closed to maintain the compartments 16 and 18 completely and partially filled, respectively.

The device of FIG. 1 can be used to provide varying degrees of barrier shielding against fallout radiation. For example if the thickness of compartment 16 is nine inches and that of compartment 18 eight inches, then the complete filling with water of compartment 16 only will provide a barrier shield having an attenuation factor of 2. However, if the adjacent compartment 18 located between enclosure 12 and 14 is also completely filled, then the attenuation factor in the innermost enclosure 14 will be 7. Access into enclosure 14 is provided by the door 34 and air for the occupants may enter through vent 36.

The variable barrier shielding device shown in FIG. 1 may be used as a fixed fallout shelter in homes, business structures and the like, or it may be employed as a movable shielding in any truck and trailer bodies, busses, railroad cars, ambulances and other vehicles. In certain cases the body of the vehicle can be readily adapted to serve as the outermost enclosure 10 or, if desired, the complete unit of FIG. 1 may be inserted within the body of the vehicle. While water has been mentioned as the material filled into the compartments 16 and 18, this is only a matter of preference in view of the fact that water is cheap and plentiful. It should be understood that any other flowable material mentioned hereinabove including particulate solids and slurries, may be employed for filling the compartments.

Figure 2:
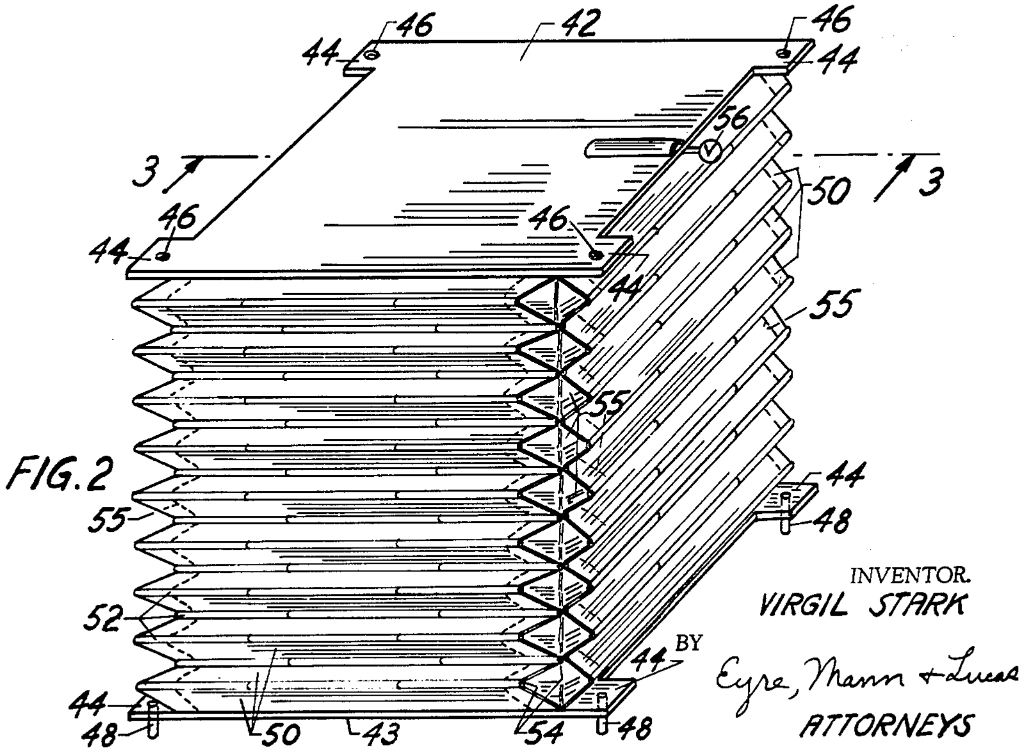
FIG. 2 is a perspective view of one form of collapsible shielding.
Figure 3:
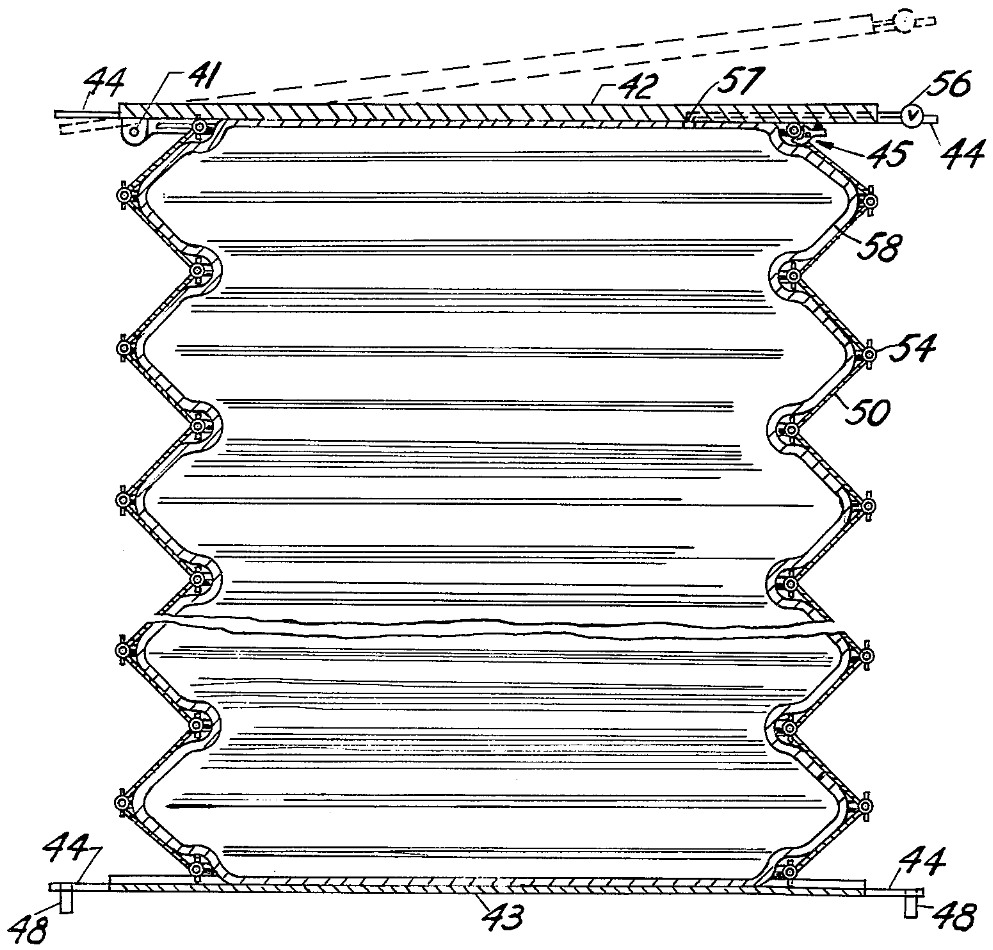
FIG. 3 is a side elevation of the shielding shown in FIG. 2.
Figure 2A:
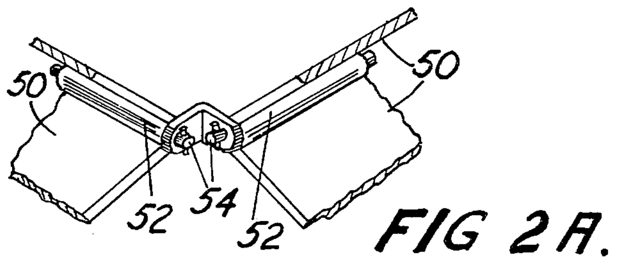
FIG. 2A is a perspective view of an enlarged scale of a portion of the structure shown in FIG. 2.

FIGS. 2 and 3 illustrate a collapsible embodiment of the variable barrier shielding of the invention. In this form of structure rigid top and bottom plates 42 and 43 are provided which include the integral tabs 44 at the corners thereof. In the tabs 44 of plate 42 a series of holes 46 are provided, whereas in the tabs of the opposite plate 43 a series of short integral rods 48, extending in a direction away from plate 42, are welded or otherwise joined thereto. Attached to both plates 42 are a plurality of rigid flat rectangular sheets 50. These sheets 40 are permanently interconnected along the longitudinal edges thereof by a series of metal links 52 which are in the form of conventional hinges having a central rod and hinge plates mounted thereon to which the sheets 40 are joined to permit movement of the sheets towards and away from each other about the axis of the central rod. The ends of links 52 are in turn connected to movable joints 54 in which the links are free to rotate. Such movable joints are a well known conventional mechanical form of coupling in the art. As shown in FIG. 2A, each alternating pair of the ends of links 52 are held adjacent each other with an angled bracket so that they will move only in a vertical direction. The pairs of links 52 above and below the bracketed pair, not being held in a fixed relationship, move horizontally towards and away from each other as the unit is extended and collapsed, respectively.

A continuous strip of flexible material 55 is attached to marginal portions of the rectangular sheets 50 along vertical lines extending across their widths in the interior of the unit to seal off the four corners formed along the vertical lines of the movable joints 54. This strip of flexible material is attached to the sheets 50 by first pulling the sheets apart to the greatest extent so as to form substantially straight vertical lines along the four corners formed by the movable joints 54. Thereafter, one side of the strip is cemented to the interior surfaces of the rectangular sheets 50 along a vertical line extending from bottom plate 43 up to upper plate 42 adjacent the vertically aligned movable joints 54. An excess of the flexible material is then gathered into a fold or tuck before the opposite side of the strip of flexible material 55 is attached to the inner surfaces of the adjacent rectangular sheets 50 which complete one corner of the unit. This fold in the continuous strip of flexible material remains disposed within the interior of the unit and flexes as the rectangular sheets are collapsed, thereby sealing the open spaces which develop between the movable joints 54 as shown at 55 in FIG. 2 along the corner where a portion of the strip of flexible material is directly exposed to view.

As shown in FIG. 3 upper plate 42 is hingedly mounted at one of its sides in the brackets 41. This permits the plate to be lifted away to provide access to the interior space of the unit. The bottom surface of upper plate 42 is provided with the dogs 45 which are adapted to receive and hold the uppermost links 54 along the four sides of the unit in position against the bottom surface of the plate 42. Dogs 45 are spring biased into a normal locking position as shown in FIG. 3 and may be rotated away from the uppermost links 54 to permit the links 54 to move into and out from the curved retaining pockets thereof as the upper plate 42 is respectively closed and opened. Any outward pressure exerted upon the sidewalls of the container will tend to more firmly engage the uppermost links 54 against the retaining pockets of the dogs 45 whereby the locking action is substantially increased. If desired, the curved retaining pockets of the dogs 45 and the adjacent bottom surfaces of plate 42 can be lined with a layer of resilient material to ensure a water tight seal when uppermost links 54 are engaged therewith.

A valve 56 extends into the side of upper plate 42 and communicates with an opening 57 leading into the closed interior formed by the interconnected sheet 50 and link 52 structure with the plates 42 and 43. As shown in FIG. 3, there may be positioned in the interior of the shielding unit a flexible bag 58 made of a strong plastic material. This is an optional feature which may be included if desired to ensure that a water tight seal surrounds the interior at all times even if one of the plates 50 or links 52 is damaged and thereby opened. If desired a plurality of flexible bags successively positioned one within the other may be employed in the interior of the unit. If desired, water may be filled not only into the interior of the innermost bag but also into the spaces between each of the plurality of bags so that if anyone of the bags should develop a leak, the water will still be within the collapsible unit by the remaining bags to provide a mass barrier against radiation.

Normally the unit shown in FIGS. 2 and 3 is stored in the collapsed position. When protection is required against fallout radiation the unit is simply filled with a flowable material such as water through valve 26. Thereupon the plates 42 and 43 move apart as the sheets 50, through the action of the ball joints 54, move into vertical position. It will be seen that the sides of the unit are completely reinforced to withstand the pressure exerted thereon by the flowable materials. Thus, the unit while collapsible for convenience of storage is nonetheless adapted to form a reinforced rigid structure when expanded which will provide immediate protection against fallout radiation. If so required, additional reinforcement can be obtained by attaching the collapsible container to a separate rigid framework, which may be dismantable for adding support to the sides of the collapsible units.

The rods 48 and holes 46 permit secure stacking of the filled units to any desired height. If desired, a number of the collapsed units may be stored with interconnections between open valves 56 whereby an entire wall of water can be raised quickly where the barrier protection is needed. If each unit is made of a square cross section with a nine inch length along the side, when completely filled with water, it will provide barrier shielding having an attenuation factor of 2. A plurality of the units can be positioned adjacent each other to further increase the attenuation factor and the degree of protection against fallout radiation. A second unit of eight inches placed adjacent to the stacks will increase the attenuation factor to 7 when filled with water.

Figure 4:
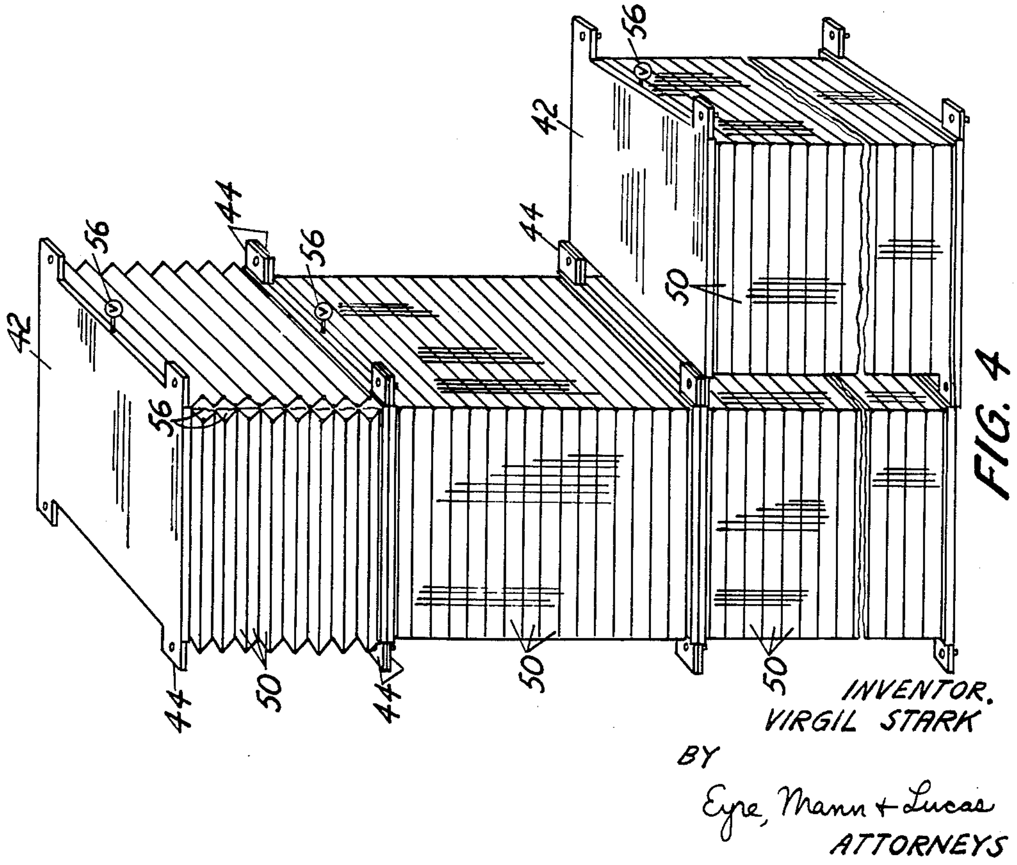
FIG. 4 is a perspecive view of several of the units shown in FIGS. 2 and 3 in a stacking arrangement.

In FIG. 4 there is shown three of the units stacked upon each other and a fourth unit adjacent the stack. The lower two units in the stack are filled completely while the uppermost unit in the stack is only partially filled. Between the bottom unit of the stack and the fourth adjacent unit it will be seen that there is an open space. However, this can be blocked off by placing an additional unit adjacent the space in an overlapping position as when a brick wall is being erected. The stacks of filled units may be two, three or as many layers deep as desired to provide any desired degree of protection against radiation.

Figure 5:
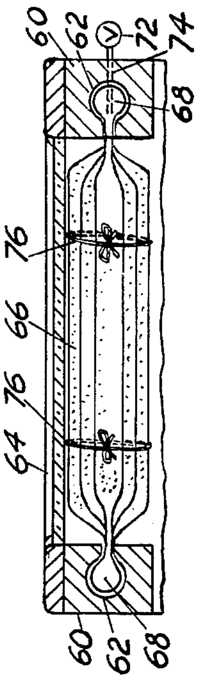
FIG. 5 is a top plan view of collapsible variable barrier shielding for doors, windows and similar openings.
Figure 6:
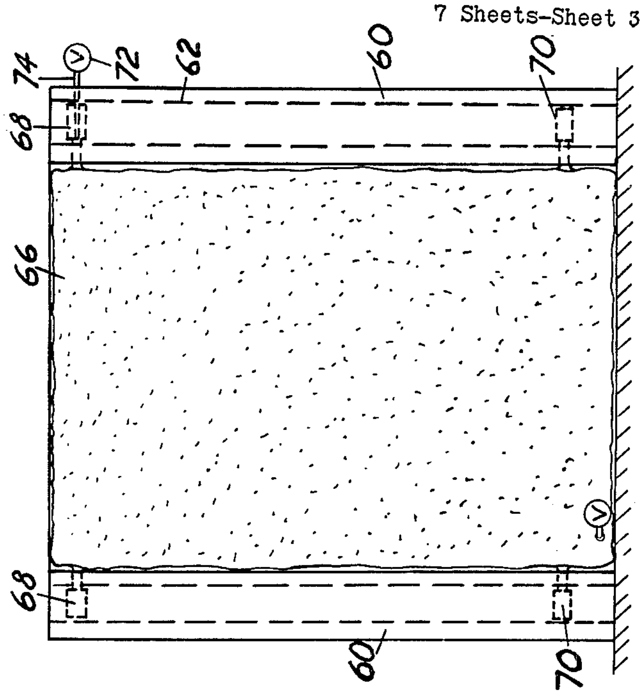
FIG. 6 is a side elevation of the shielding shown in FIG. 5 when expanded for fallout protection.

FIGS. 5 and 6 illustrate another embodiment of the invention by which variable barrier shielding against radiation may be effectively and quickly erected to block windows, doors and similar openings in building structures. In this embodiment, one of a pair of beams 60, having a channel 62 extending throughout its length, is vertically positioned along each side of the opening of, for example, a window 64. A flexible bag 66, of rubber or plastic material and of dimensions such that the bag covers the entire window (FIG. 6), is joined at its corners to members 68 and 70 which are keyed to fit within the channels 62. Upper members 68 are fixed against movement within channels 62 by welding or other suitable means while lower members 70 are free to move upwardly or downwardly in the channels 62. A valve 72 controls exit or entry of flowable material through pipe 74 which extends through one of the upper members 68 and communicates with the interior of the bag 66. The valve 72 may be connected to existing water lines of the building or to a separate hose which will feed water into it in conventional manner.

Normally lower members 70 are positioned adjacent the bottom of upper members 68 and the bag 66 is folded and collapsed. As shown in FIG. 5 the bag is gathered and maintained in the folded position with the aid of pieces of cord 76 or other suitable means. In this position of storage, the bag 66 occupies the space along the top of the window and, if desired, may be hidden from view by recessing it in the top ceiling of the window opening or by providing some form of valence across the top of the window opening.

When there is need for radiation protection, the cords 76 are untied, thereby permitting lower members 70 to slide down to the bottom of the window opening and the bag 66 to unfold as shown in FIG. 6. Thereafter, valve 72 is opened and the bag 66 is filled with water. The bag will inflate to a particular thickness when filled completely and this can be varied as desired by selection of a bag having particular capabilities as to stretching and initial dimensions to provide various degrees of protection against radiation.

Instead of storing the collapsed bag along the upper spaces of the window opening, the same may be done along the bottom of the window opening. In this event, upper members 72 are slidable and lower members 70 fixed against movement in the channels 62, and the valve 72–pipe 74 means for supplying water to the bag 60 extends through one of the lower members 70. As water is fed into the bag 66, the expanding volume will force the upper members 68 to slide upwardly in the channels 62 and this will guide the bag up to the top of the window opening. If desired a plurality of the bags positioned as desired either adjacent or on top or below each other can be arranged to provide multiple or various combined layers of barrier shielding in the window space and this will increase the attenuation factor and the degree of protection. It will be noted that this embodiment of the invention provides a means for rapidly converting potentially dangerous building openings through which lethal radiation can readily pass into relatively safe areas for the occupants.

Figure 7:
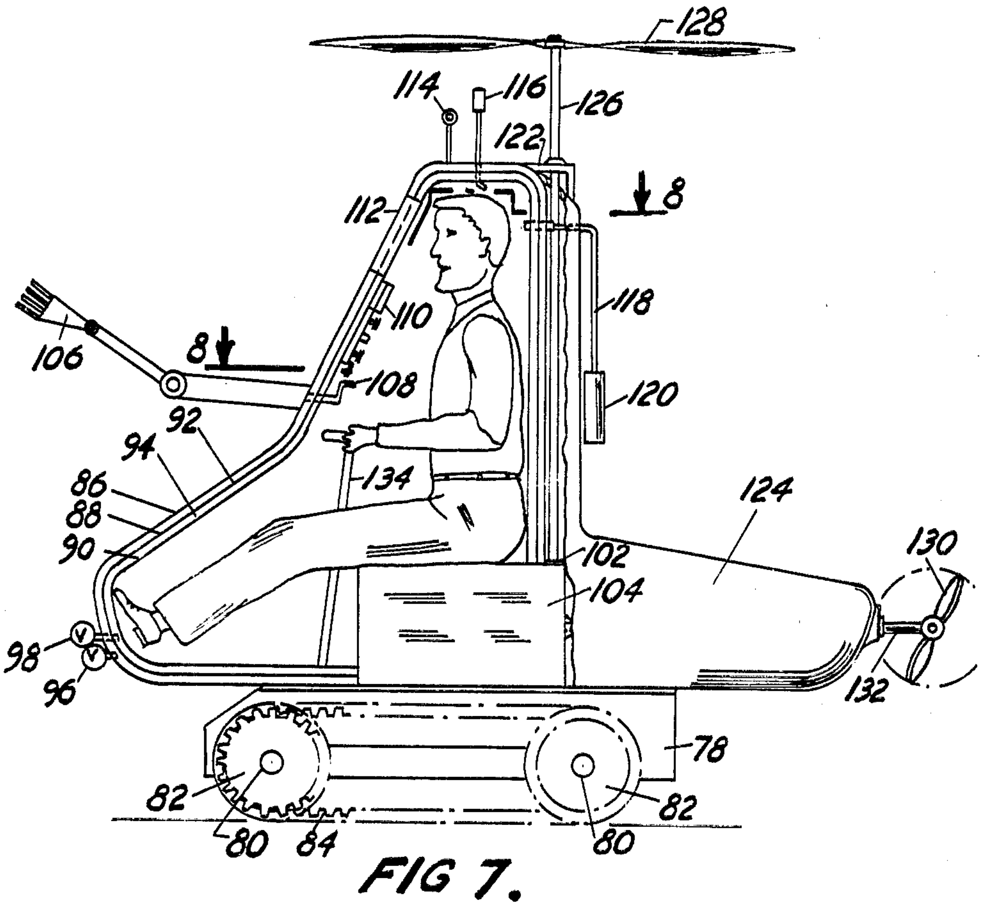
FIG. 7 is a side elevation with some parts in section of a movable device which provides protection for the rider.
Figure 8:
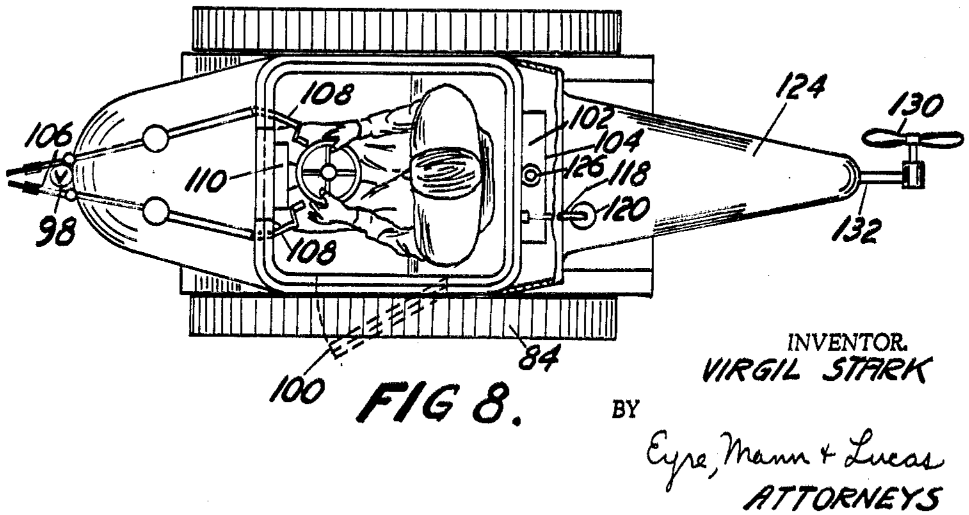
FIG. 8 is a top plan view of the device of FIG. 7.

FIGS. 7 and 8 illustrate another embodiment of the invention in which variable barrier shielding is provided in a vehicle which will both protect the rider against fallout radiation and also permit him to move about in contaminated areas. As shown in FIG. 6, the vehicle includes a platform 78 in which two axles 80 are journaled in conventional manner with wheels 82 mounted on the ends thereof. Wheels 82 are preferably provided with peripheral notches which engage with mating notches in an endless metal belt 84 arranged to move about each pair of wheels located on each side of the platform. This arrangement of wheels 82 and belts 84 provides two treads for the platform 78 conventionally known as caterpillar treads.

Positioned on platform 78 are the three enclosures, 86, 88 and 90 which are successively enclosed one within the other to provide two individual adjacent compartments 92 and 94. As shown in FIG. 8 these compartments completely close off and envelop an interior air space and thereby form a body for the vehicle to be occupied by the rider. Located in the walls of enclosures 86 and 88 are valves 96 and 98 respectively. These valves control entry and exit of flowable material into and out of the compartments 92 and 94. A door 100 is hingedly mounted in one side of the vehicle body to provide access to the interior side of the vehicle body to provide access to the interior thereof. Preferably, this door is hollow and filled with barrier shielding material, and also gasketed to provide a substantially air tight seal when shut.

Beneath the vehicle body, a box 102 is provided which serves as a cover for a gasoline engine, electric battery, or other driving means enclosed therein (not shown). The engine is arranged to drive the wheels 82 through a conventional gear box. In the front wall of the vehicle body is mounted a pair of grasping devices or mechanical arms 106 which may be operated remotely by the controls 108 which extend into the interior of the body. Such conventional mechanical grasping devices are commercially available articles and can be used for carrying out various operations remotely which involve the handling of radioactive materials.

Above the controls 108 for the grasping device 106 is located an instrument panel board 110 which provides controls and indications for the various components of the vehicle as will be hereinafter described. Above the instrument panel board 110 and generally aligned with the rider's line of sight is located a transparent panel 112 preferably made of heavy glass which may be solid or hollow and filled with water. Located above the transparent panel 112 is a conventional sensing device 114 which will detect and measure levels of the gamma radiation in the atmosphere surrounding the vehicle. Also positioned above the transparent panel 112 is a periscope 116 which may be rotated 360° so that the rider can scan the entire horizon without having to move the vehicle itself. In the rear portion of the vehicle body, a blower driven by the engine (not shown) provides the air for respiration inside the enclosure. The air intake is provided with an air tube 118 having a filter 120 at the end thereof which will block the entry of radioactive particles into the interior of the body as previously described. Conventional apparatus is provided for the absorption (by chemicals, for instance) of the carbon dioxide, which may accumulate in the enclosure, resulting from respiration. Optionally the rear wall of the vehicle body is integral with a separate wall 122 which extends outwardly from the rear of the vehicle in the form of the cone-shaped extension 124 at the lower portion thereof. Through the top of wall 122 optionally extends a shaft 126 which carries the propeller 128 at its upper end and which is connected to the gasoline engine beneath the vehicle body through conventional gearing in the gear box. Likewise and optionally a second propeller 130 is mounted on shaft 132 which extends through the cone-shaped extension 124 to the gear box for connection to the engine.

The instrument panel board 110 is optionally equipped with a small radio receiver and transmitter to permit the rider to communicate with persons outside of the sealed vehicle body. The instrument board 110 carries all required instruments and controls, some of which are shown in FIG. 7, and is to be assembled in conventional manner. Lever 134, extending from the platform 78, is a hand control which permits the rider to steer the vehicle in any desired direction.

When the vehicle shown in FIGS. 7 and 8 is to be used in a radioactive area, one or both compartments 92 and 94 is first filled with flowable material such as water through valves 96 and 98. Thereafter, the rider enters the vehicle body through door 100. After the door is closed, the rider is completely enveloped within the protective barrier of the flowable material positioned around the vehicle body. The use of the caterpillar treads 84 permits the rider to move over rough terrain. Operation of the propeller 128 aids the rider's movement over terrain in that a lifting force is provided which lightens the weight of the vehicle. In fact, with proper selection of gearing and power of the gasoline engine, propeller 128 can completely lift the vehicle off the ground in the manner of a helicopter. In this event propeller 130 is provided to compensate for the pressure generated by propeller 128 and give the rider control over the direction of flight. The cone shaped extension 124 in addition to providing space for a fuel tank also may be used for storage of various materials. The grasping device 106 permits the rider to manipulate outside objects to a certain extent without having to leave the interior of the vehicle body. It will also be noted that propeller 128 provides a decontaminating effect by blowing a strong draft of air down upon the surfaces of the vehicle. If desired, an open framework can be erected about the propeller 130 for the purpose of supporting a large filter in position over the propeller whereby the draft of air blown down upon the surfaces of the vehicle is purified and a greater decontaminating effect at the vehicle surfaces achieved.

Figures 9, 10, 11:
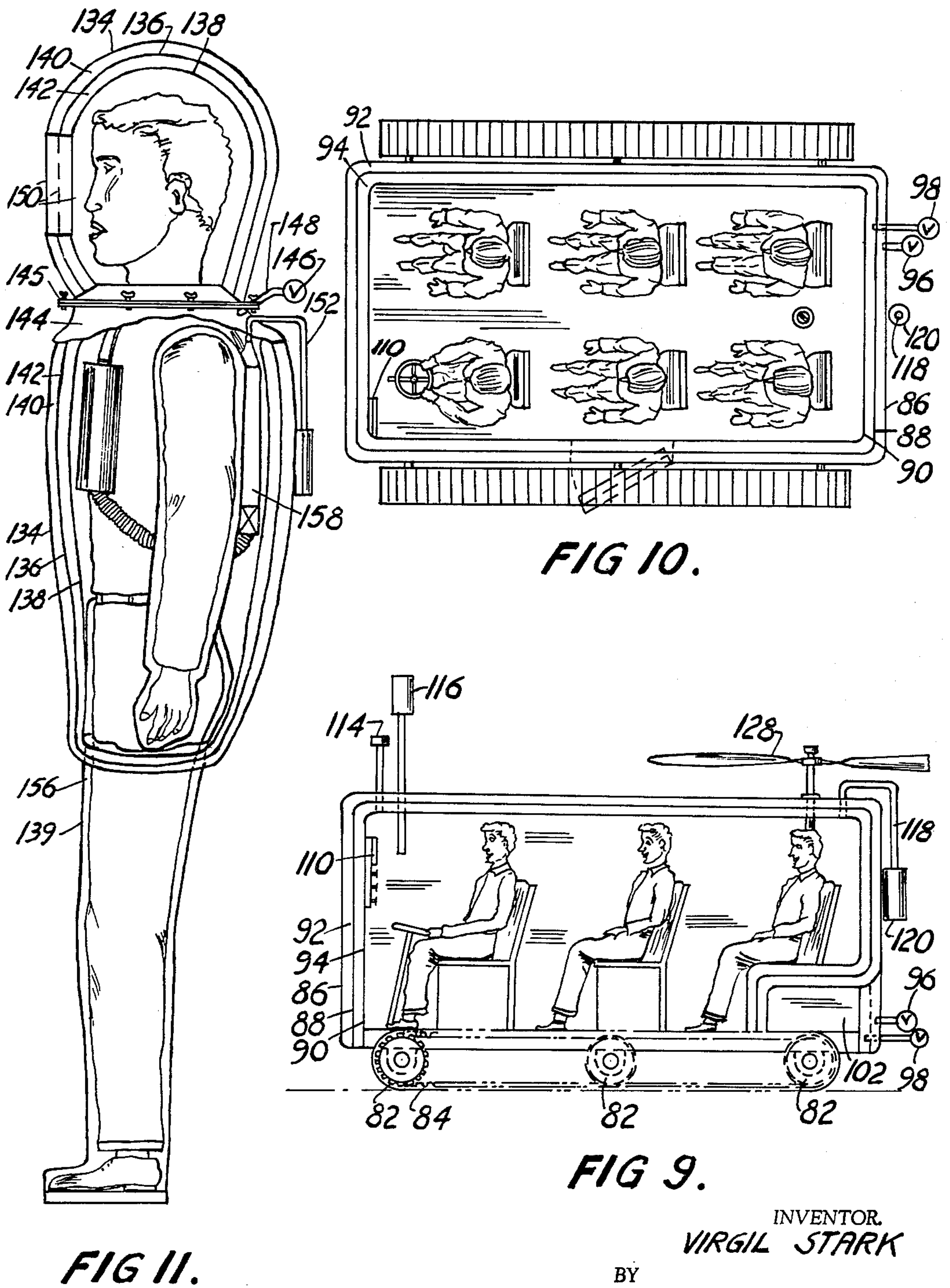
FIGS. 9 and 10 are views similar to FIGS. 7 and 8, but showing a larger movable device for protection of a number of persons.
FIG. 11 is a side elevation with parts in section of a garment adopted to provide individual fallout protection for the wearer.

FIGS. 9 and 10 show a vehicle similar to the one illustrated in FIGS. 7 and 8 except that the latter structure is intended to provide radiation protection and mobility for more than one person. In FIGS. 9 and 10 the numerals represent the same structural elements as those shown in FIGS. 7 and 8. Structures as shown in FIGS. 7 to 10 can optionally be built as sealed units combined with conventional means, to allow submersion beneath water by filling certain compartments with water to increase the weight and thereafter, pumping out the water to allow the structure to be lifted in a manner similar to a submarine. The structure can also be built, in conventional way, as an amphibious vehicle with adequate additions for such type of structure. The embodiments of the invention shown in FIGS. 7 through 10, combine the principle of variable barrier shielding used throughout the invention with the advantage of mobility. This will allow persons to not only move in and out of shelters but also enables them to get out of contaminated areas and in addition, obtain the special geometrical shielding of being lifted in the air or submerged beneath a thick layer of water in nearby rivers, lakes, etc.

FIG. 11 illustrates another embodiment of the invention in the form of a garment which provides protection against fallout radiation for an individual person. This garment is preferably made in three parts which surround different portions of the wearer's body, namely, the head, the trunk and the arms, and the legs. As shown in the drawing, a head piece is formed by three enclosures 134, 136 and 138 which are positioned successively one within the other to provide the adjacent compartments 140 and 142. These enclosures are formed of rigid material and joined to a circular base 143. In the area directly opposite the wearer's line of sight, the enclosures 134, 136 and 138 are interrupted and a series of transparent plates 150 are interposed and connected thereto. These plates 150 may be made of glass or preferably of rigid plastic to reduce the danger of breakage and injury to the wearer. The circular base supporting the head piece is adapted to be joined with a rigid plate 144 which rests upon the shoulders of the wearer. This may be done by screw-threads or other conventional means as are used to secure helmets to diving suits. The plate 144 is integral with a plurality of spaced layers of material 134, 136 and 138 which provide similar individual adjacent compartments 140 and 142 extending around the trunk of the wearer's body. The material used in this portion of the garment is preferably semi-rigid but with some flexibility in order to maintain the uniform spacing of the compartments while allowing for comfort. The rigid plate 144 helps to distribute the weight of the garment more uniformly over the shoulders while maintaining the spacing of the compartments 140 and 142. The trunk portion of the garment extends down below the wearer's crotch where two holes are provided through which the wearer's legs extend. These holes are lined along the circumference with an elastic material which will maintain the trunk portion of the garment tightly engaged around the wearer's legs, providing a barrier for the body above the legs including the genital organs for protection against radiation emanating from the ground.

In addition to providing support and uniform weight distribution, the rigid plate 144 also acts as a manifold for the compartments 140 and 142 located in the head piece and the trunk portion of the garment, whereby these compartments may be filled with flowable material. This is accomplished by means of valve 146 which controls exit and entry of flowable material through pipe 148 which leads into plate 144. Along the underside of plate 144 branch lines lead from pipe 148 into the individual compartments 140 and 142 above and below the plate in conventional manner (not shown). Thus the compartmets 140 and 142 may be quickly filled with flowable material such as water when such is necessary.

In the rear portion of the rigid plate 144 an air line 152 is provided which permits entry or exit of vapors within the interior of the garment. This line may be optionally combined with an intake into a refrigerating unit combined with a blower. The inlet air tube is connected with a filter 154 and optionally with a conventional unit for absorbing the carbon dioxide which may accumulate.

The garment includes a separate trouser portion which completely envelops the legs and feet of the wearer. As can be seen from the drawing the trousers comprise a single layer of protective material 138 without the sealed compartments employed in the trunk portion of the garment. Likewise the sleeves surrounding the wearer's arms also are made of a single layer of protective material 138 without a sealed compartment. The reason for this is that the limbs of the wearer are not as sensitive to radiation damage and do not require as great a degree of protection as the vital organs in the trunk and in the head. Consequently, the single layer of material 138 surrounding the wearer's limbs is covered with flakes of material such as lead which will provide some barrier shielding though perhaps not to the extend of the remaining portions of the garment. This will help to lighten the weight of the garment and also give the wearer greater freedom of movement of his limbs where such is most required. However, if desired one or both of the compartments 140 and 142 may be extended so as to cover the entire body of the wearer including the limbs to increase the degree of protection around the entire body.

As will be obvious from the drawings, the garment offers both protection and mobility for individuals so that they may leave fixed fallout shelters in contaminated areas. In use, the valve 146 is opened and flowable material such as water is injected through pipe 148 into the compartments 140 and 142 until they are completely filled. Thereafter, valve 146 is closed and the vulnerable parts of the wearer's body such as the head, spine, heart, lungs and reproductive organs are completely surrounded by a double layer of barrier shielding. In the event that non-transparent flowable material is to be used to fill the compartments 140 and 142, then the plates 150 may be replaced with a solid block of transparent material or a closed hollow block filled with water or other transparent material so that filling of the compartments 140 and 142 will not block the wearer's line of sight.

If the weight of the garment becomes unduly heavy when filled with flowable material, one or more balloons holding large volumes of buoyant light gases such as hydrogen or helium may be attached to the garment in order to lighten the weight load. The light gases are released, when so required, from a container where such gases are stored at high pressures (2000 p.s.i.g., for instance). In FIG. 11 the individual is shown wearing a unit 158 which comprises a compact portable refrigeration unit for absorption of body heat. Such a unit is disclosed in Stark Patent Nos. 3,000,190 and 3,000,191 and, if desired, may be used in conjunction with the garment of this invention to add to the wearer's comfort.

Figure 12:
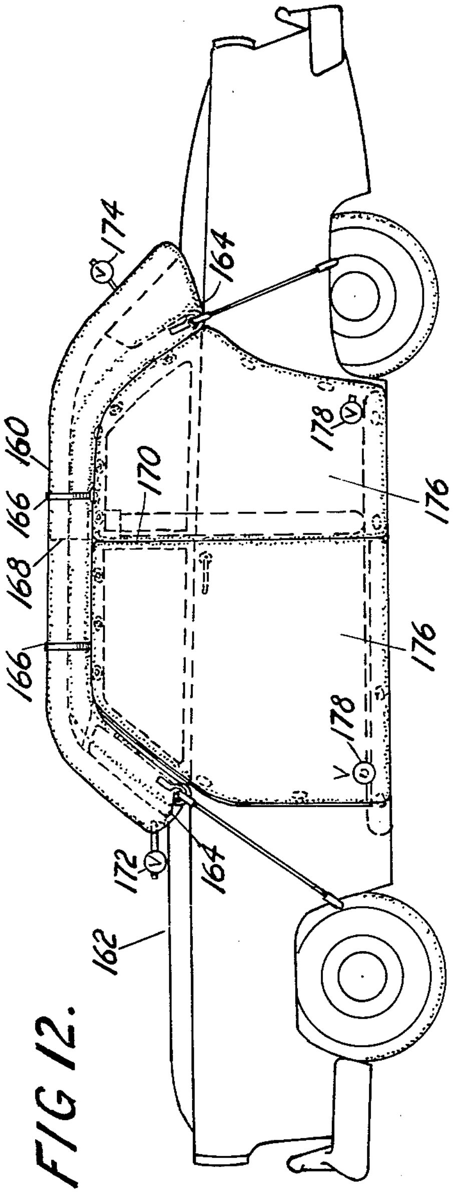
FIG. 12 is a side elevation of an automobile provided with collapsible barrier shielding of the invention.
Figure 13:
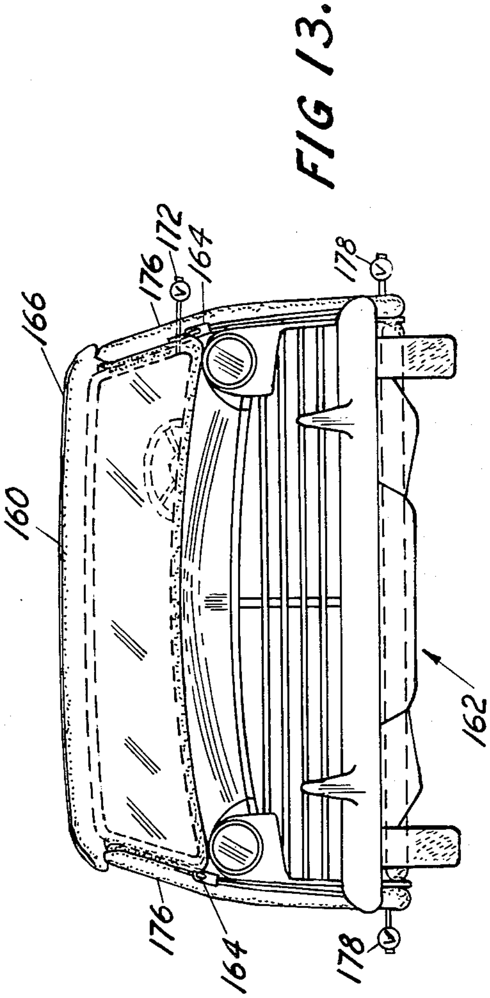
FIG. 13 is a front end view thereof.

FIGS. 12 and 13 illustrate an application of the principles of the present invention by which a conventional automobile is adapted to provide mobile radiation protection so that the passengers may rapidly move through and out of a contaminated area. As shown in FIG. 12, a large flexible bag 160 is positioned on top of the roof and front and rear windshields of an automobile 162. The bag is provided with attachment means 164 at its corners which secure the bag to the body of the automobile. Additional support and reinforcement is given by the straps 166 which extend across the top of the bag 160, with the ends of the straps being attached to the sides of the automobile roof. The bag 160 may be made entirely from transparent material as illustrated, or transparent sections may be used for the areas adjacent the front and back windshields in order to permit the driver to see. Preferably, the bag includes a transverse partition 168 positioned across the automobile roof in alignment with the trailing vertical edges 170 of the front doors, and valves 172 and 174 communicate with the interiors of the front and back portions of the bag 160. With this arrangement, one closed compartment of the bag 160 extends from the front windshield back to the partition 168 and a second closed compartment from the partition 168 back to the rear windshield. The valves 172 and 174 permit the filling of either one or both of the compartments with flowable material whereby barrier shielding can be provided across the tops of either the front or rear passenger spaces or across the top of both passenger spaces.

A second flexible bag 176 is positioned against both of the front doors of the automobile. This bag is secured against the surface of the doors by means of conventional hook and eyelet fasteners or other suitable means extending along the top of the door. For example, the hook portions of the fasteners are attached to the top of the bag 176 and the eyelet portions are attached to the top of the door. The same fasteners are positioned along the bottom of the passenger bag 176 and along the bottom of the door so that at least the top and bottom portions of the bag are firmly held in place against the door. However, if desired the hook and eyelet fasteners may also extend along the vertical sides of the flexible bag 176 and the door. A valve 178 communicates with the interior of each of the flexible bags 176 to permit the filling of the bag with flowable material.

Two additional flexible bags 176 are positioned against the sides of the automobile adjacent the rear passenger space. These bags are held in place either by the hook and eyelet fasteners as illustrated, or, if the automobile is a two door model, the bags may be attached directly to the roof and underbody as these bags will not have to move away from the roof of the automobile to permit access into a passenger space as is necessary in the front passenger space.

Positioned adjacent to the rear of the front seat, is a collapsible flexible bag unit similar to the one previously illustrated in FIGS. 5 and 6 and described in connection with radiation protection across building openings. This bag may be stored along the roof of the passenger space or along the floor just to the rear of the front seat. With this arrangement the front passenger space may be separated from the rear passenger space with a curtain of flowable material whenever barrier shielding is desired only for the front passenger space. Furthermore, additional flexible bags can be positioned along the floor of the front and rear passenger space to increase the degree of barrier shielding which is naturally provided by the construction of the underbody of the automobile.

It will be evident that the embodiment of the invention shown in FIGS. 12 and 13 provides a simple and effective way for using an ordinary automobile as a protective device by filling the flexible bags surrounding the body of the vehicle with flowable material. If desired, a plurality of bags may be positioned adjacent each other to provide a variation in the degree of barrier shielding which can be obtained, depending on the ambient radiation levels.

Figure 15:
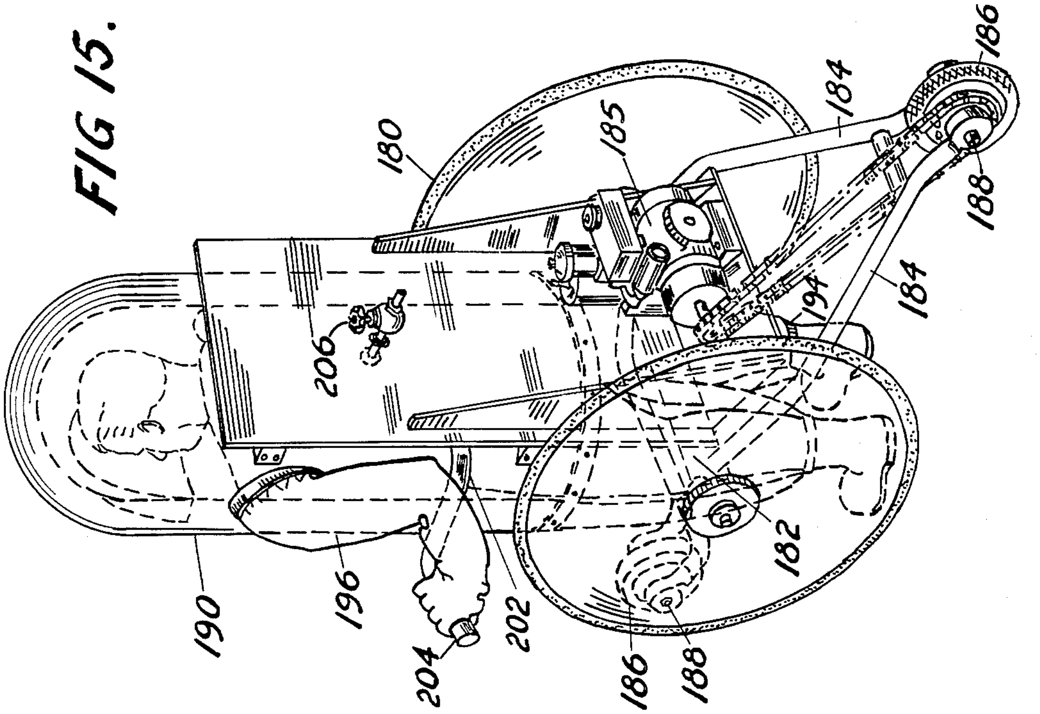
FIG. 15 is a rear perspective view of the device shown in FIG. 14.
Figure 14:
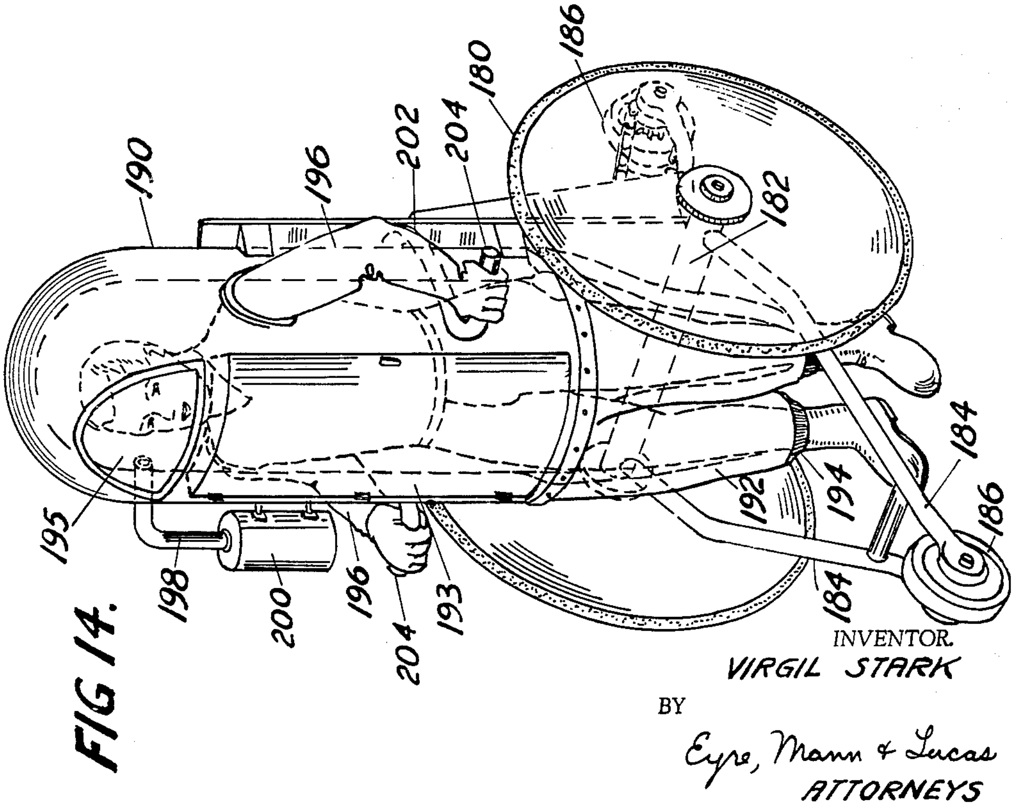
FIG. 14 is a front perspective view of a protective device which enables the user to walk about in a radioactive contaminated area without having to support the weight of the radiation shielding upon his body.

FIGS. 14 and 15 illustrate another protective device which enables the user to walk about in contaminated areas without having to support any substantial weight. As shown in these figures, a pair of large wheels 180 are mounted for rotation on a horizontal axle 182. The arms 184 extend down to points in front and to the rear of the horizontal axle 182. These points are located in a vertical plane passing through the mid-point of the axle 182, and two smaller wheels 186 are mounted for rotation on horizontal axles 188 journaled in the lower ends of the arms 184. In the space between the two arms 184 which extend rearwardly of the horizontal axle 182, a small engine 185 is optionally mounted and connected to drive the rear wheel 186. Supported upon the horizontal axle 182 is a rigid dome-like enclosure 190 which is provided with at least an inner and outer wall spaced apart to form a closed compartment therebetween as described in the previous embodiments of the invention. From the bottom of the dome-like enclosure extend the flexible trouser legs 192, also having at least an inner and outer wall forming a closed compartment which communicates with the compartment of the dome-like enclosure 190. The bottom openings 194 of the trouser legs 192 are lined with elastic material along the peripheries thereof so that the openings can be tightly engaged around the ankles of the person who is to use the protective device.

A door 193 is mounted in the front of the dome-like enclosure 190 by which a person can enter the interior thereof. A portion of the front wall of the enclosure is formed of transparent material 195 to permit the occupant of the enclosure to see through the enclosure wall. From both sides of the enclosure 190 a sleeve 196 of flexible material extends into which the occupant can insert his arms. The air line 198 extends into the interior of the dome-like enclosure 190 with a filter 200 mounted at its opposite end for blocking entry of radioactive particles as previously described hereinabove. Extending up from the horizontal axle are push rods 202 which are constructed so as to provide the two handles 204 which are spaced apart in front of the dome-like enclosure. A valve 206 is mounted in the wall of the enclosure 190 to permit the filling of the compartment surrounding the interior of the enclosure with flowable material.

The device shown in FIGS. 14 and 15 is used by first filling the compartment thereof with flowable material such as water through the valve 204. Thereafter, an individual enters the interior of the enclosure through the door 193, inserting his legs in the trousers 194, then closing the door, and finally inserting his arms into the sleeves 202. At this time, the individual stands in the space between the front wheel 186 and the horizontal axle 182. The individual can then grasp the handles 204 and push the device over the ground as he walks. Operation of the engine 185 will give a small driving force to the rear wheel 196 to aid the individual in pushing the device over the ground. The device makes contact with the ground at the four spaced points of wheels 180 and 186 and this provides sufficient stability to prevent tipping. The individual is protected at all times as he walks and pushes the device through a contaminated area. Furthermore, substantially all of the weight of the device is independently supported by the horizontal axle 180 so that the individual can easily move about without excessive fatigue and effort.

Water is preferably used as the barrier shielding in the foregoing embodiments of the invention and preferably distilled water without any dissolved, suspended or other materials. By using water several objectives and results can be obtained in addition to the shield barrier:

(1) The water will cool the protected area.

(2) The water is stored for usage at a later time after nuclear detonations, when and if required, since the natural reduction of radiation levels permits use of smaller attenuation factors at such later time.

The application of my invention will permit the survival of many persons in case of a nuclear attack. It will allow them to obtain certain protection against fallout in existing living quarters, hospitals, schools, shops, etc. by quickly covering openings and inflating collapsible compartments with water. It will allow people to enter, leave and go back and forth between existing shelters in different locations for emergencies, to police contaminated areas, to arrange for a return to normal conditions, and to conduct any other affairs necessitated by the situation.

It will permit persons to obtain protection for certain periods. It will provide means to carry or compensate for the heavy weight of the masses that allow protection against radiation in either mobile units or garments. Conventional automobiles, trucks, busses, railroad cars, could be rapidly changed into protective mobile shelters, allowing persons to leave for less hazardous areas or for larger shelters. In peacetime, some of the collapsible units could be used for conditioning and cooling enclosures by the water, acting as an insulator and a cooler.

It will be understood that it is intended to cover all changes and modifications of the preferred embodiment of the invention herein chosen for the purpose of illustration which do not constitute departures from the spirit and scope of the invention.

I claim:

1. A device for protection against gamma radiation emanating from radioactive nuclear fallout which comprises top and bottom rigid plates, a plurality of rectangular sheets of substantially rigid material connected to each other along their lengths and to said rigid plates so as to form intermediate side walls and a substantially closed interior with said rigid plates, the interconnections between said rigid sheets being in the form of metallic reinforcing links adapted to permit hinged movement of said rigid sheets towards and away from each other, the ends of said links being mounted in movable joints in which the links are free to rotate with alternate pairs of the ends of said links being fixed against horizontal movement towards and away from each other, a portion of the interior surfaces of said rectangular sheets adjacent said movable joints being attached to a sheet of flexible material whereby the openings between said movable joints and the widths of said rectangular sheets are closed off by said flexible material, means positioned in one of said rigid plates for filling the closed interior with a flowable material whereby said rigid plates may be stored in collapsed position and extended apart when filled with flowable material to provide barrier shielding against gamma radiation.

2. A device in accordance with claim 1 in which tabs are provided at each corner of said rigid plates, the tabs of one plate having holes positioned therein and the tabs of the other plate having rods positioned in alignment with said holes whereby a plurality of the devices may be stacked upon each other.

3. A device in accordance with claim 1 which includes at least one bag of flexible material positioned within the interior of said device to provide a water tight seal thereabout.

4. A device in accordance with claim 1 in which one side of said top rigid plate is hingedly secured to one of said rectangular sheets whereby said top rigid plate may be moved away from the sidewalls of the device for access into the closed interior thereof.

5. A device for protection against gamma radiation emanating from radioactive nuclear fallout and passing through windows and other building openings which comprises a beam having a channel extending throughout its length, one such beam being positioned along each of the vertical sides of the building opening, a flexible bag of dimensions such as will cover the entire building opening, each corner of said bag being integral with a member keyed to slide within the channel in said beam, said keyed members being positioned within the channels in said beams so as to hold the flexible bag in position adjacent and covering the building opening, two of said keyed members being fixed against movement within the channels whereby one end of said flexible bag is maintained in fixed horizontal position, means extending into one of said fixed keyed members for filling said flexible bag with a flowable material, means for maintaining said bag in collapsed position in which the movable of said keyed members are adjacent the fixed members, said bag being released from collapsed position to cover said building opening when filled with the flowable material, thereby providing barrier shielding across the building opening.

6. A device in accordance with claim 5 in which the flexible bag is filled with water.

7. A device in accordance with claim 5 in which the upper pair of said keyed members is slidable within said channels whereby the flexible bag is maintained in collapsed position along the bottom of the building opening.

8. A device in accordance with claim 5 in which the lower pair of said keyed members is slidable within said channels whereby the flexible bag is maintained in collapsed position along the top of the building opening.

9. A device in accordance with claim 5 in which the flexible bag is stored in a collapsed position along the sides of the building openings with the guiding channels on the top and bottom of such openings.

10. A device in accordance with claim 5 in which the channel extending through the length of said beam is of substantially circular cross section.

11. A device for individual protection against gamma radiation emanating from radioactive nuclear fallout which comprises a plurality of rigid dome-shaped enclosures, at least one of said enclosures being positioned within and in spaced relationship to another of said enclosures to form a closed compartment which surrounds an interior space, a pair of trouser legs attached to the bottom of said compartment and formed of at least two layers of flexible material so as to form a second compartment which communicates with said first compartment, means for filling said compartments with flowable material and thereby provide barrier shielding of an attenuation factor of at least 1.5 against penetration of gamma radiation into said interior space, a sleeve of flexible material extending from each of two openings in said dome-shaped enclosures and adapted to cover the arms of the individual, a door positioned in the walls of said enclosures providing access to said interior space, means communicating with said interior space so as to permit exit and entry of air, a portion of the walls of said enclosures being transparent, said enclosures being supported upon an axle having a wheel mounted for rotation at each end thereof, a plurality of rigid arms extending down from said axle and terminating at two points positioned in spaced relationship to each other on a line extending normal to said axis and at opposite sides thereof, said points being relatively closer to the ground than the level of said axle, a wheel mounted at each of said points for rotation between the ends of said rigid arms, a pair of rigid push members extending up from said axle along opposite sides of said enclosures and having handles at the ends thereof positioned in spaced relationship with respect to said door, said handles being grasped by the occupant of the interior space of said enclosures to push the device over the ground while simultaneously walking through a radiation contaminated area.

12. A garment for protection against gamma radiation emanating from radioactive nuclear fallout comprising a head piece formed of three enclosures adapted to envelop the wearer's head, said enclosures being positioned within and in spaced relationship to each other so as to form two adjacent closed compartments each having a selected thickness, a portion of said enclosures being made of transparent material, a plate member adapted to rest upon the wearer's shoulders, means for connecting the head piece to said plate member, a trunk portion comprising three layers of semi-flexible material extending down from said plate member and forming two adjacent closed compartments which envelop the trunk of the wearer's body and include openings through which the wearer's legs may extend, at least one layer of said semi-flexible material being integral with said trunk portion and enveloping the wearer's arms, means extending through said plate member for filling said compartment with a flowable material, means communicating with the interior of said head piece and trunk portion for permitting entry and exit of air, a trousers portion comprising at least one layer of said semi-flexible material which completely envelops the legs and feet of the wearer and which provides barrier shielding of an attenuation factor of less than 1.5 against gamma radiation, and said compartments, upon being filled with flowable material, providing barrier shielding of an attenuation factor of at least 1.5 gainst gamma radiation.

References Cited by the Examiner

UNITED STATES PATENTS

| | | | |
|---|---|---|---|
| 2,642,542 | 6/1953 | Weinberg | 2—81 |
| 2,649,549 | 8/1953 | Green | 250—106 |
| 2,773,459 | 12/1956 | Sechy | 250—108 |
| 2,807,727 | 9/1957 | Fermi | 250—108 |
| 2,857,525 | 10/1958 | Ferdon | 250—108 |
| 2,871,367 | 1/1959 | Gournay | 250—105 |
| 2,897,668 | 8/1959 | Graham | 50—52 |
| 2,937,127 | 5/1960 | Flora | 250—108 |
| 2,942,115 | 6/1960 | O'Connell | 250—108 |
| 3,043,300 | 7/1962 | Flagg | 2—81 |

RALPH G. NILSON, *Primary Examiner.*

J. W. LAWRENCE, *Assistant Examiner.*